United States Patent
Combs

[15] 3,701,937
[45] Oct. 31, 1972

[54] PULSE-WIDTH MODULATED DC TO DC CONVERTER WITH ZERO PERCENT DUTY CYCLE CAPABILITY

[72] Inventor: Donald Earle Combs, Parsippany, N.J.

[73] Assignee: Bell Telephone Laboratories, Incorporated, Murray Hill, N.J.

[22] Filed: Dec. 30, 1971

[21] Appl. No.: 214,312

[52] U.S. Cl. ...................... 321/2, 307/265, 321/11, 321/14, 321/18, 321/19
[51] Int. Cl. ............................................. H02m 3/32
[58] Field of Search ................. 321/2, 11, 14, 18, 19; 307/265

[56] References Cited

UNITED STATES PATENTS

| | | | |
|---|---|---|---|
| 3,355,653 | 11/1967 | Paradissis | 321/2 |
| 3,394,299 | 7/1968 | Lawn et al | 321/11 |
| 3,432,737 | 3/1969 | Hunter et al | 321/2 |
| 3,584,289 | 6/1971 | Bishop | 321/2 |

Primary Examiner—William H. Beha, Jr.
Attorney—R. J. Guenther et al.

[57] ABSTRACT

A pulse-width modulated DC to DC converter is enabled to operate into short circuits and limit the current output by having the capability of operating at zero percent duty cycle. The regulation feedback loop utilizes a light-emitting diode and phototransistor optical arrangement to permit isolation between the input and output sides of the converter. The light emitting diode is responsive to voltage monitoring and current monitoring circuitry on the output side of the converter. The converter operates in a crossover mode in which the regulation switches from voltage regulation to current regulation or vice versa as load conditions change.

8 Claims, 5 Drawing Figures

PULSE-WIDTH MODULATED DC TO DC CONVERTER WITH ZERO PERCENT DUTY CYCLE CAPABILITY

BACKGROUND OF THE INVENTION

This invention relates to converter circuits. It is more specifically concerned with regulated converter circuits in which the switching devices are pulse-width modulated. It is primarily directed to continuously operating pulse-width modulation circuitry to limit the maximum current output of a converter and permit self-starting into a short circuited load.

Converter circuits must be protected against short circuits and overloads appearing across the output load terminals. The high currents drawn by these short circuits and overloads occurring across the output terminals of the converter may severely damage or destroy the switching devices in the converter circuit. Many converter circuits provide protection against these high currents by utilizing a current detector to monitor the output currents of the converter. When the output current exceeds a certain threshold, the detector generates a signal to operate a shutdown circuit to shut the converter off. This protection arrangement has the disadvantage that starting circuitry must be included to restart the converter circuit. If the short circuit is intermittent or has not been removed, the converter circuit shuts down again, hence the converter circuit may become inoperative for a substantial time period. An alternative approach to achieve short circuit protection is to respond to a current overload by reducing the duty cycle of the converter switching devices to a very small value. This technique is used in regulated converter circuits where the switching devices are pulse-width modulated. This method of protecting the converter against short circuits, however, requires extremely careful design. Such things as the minimum output voltage at overload and the internal power consumed by the converter circuit must be precisely known in advance. The minimum duty cycle must be carefully selected to match the internal power consumption. In addition, the characteristics of the semiconductor switching and amplifying devices used tend to vary slightly from one device to another. Hence, in some circuits the output current will still attain high values in case of a short circuit despite the theoretical protection afforded by the minimum duty cycle selected.

It is, therefore, an object of the invention to protect the converter against a short circuit by positively limiting its current output.

It is another object of the invention to operate the converter circuit at a zero percent duty cycle, if necessary, should a short circuit occur at its output.

It is yet another object to permit the converter to automatically start even though a short circuit is connected to its output terminals.

It is still another object to limit the current output of a converter circuit without turning off the converter circuit.

BRIEF SUMMARY OF THE INVENTION

In accord with the above stated objects, the invention is a pulse-width modulation scheme to regulate a DC to DC converter. The pulse-width control circuit driving the switching devices of the converter has a timing range which permits the reduction of their conduction periods to a zero percent duty cycle. The pulse-width control circuitry modulates the pulse output of a periodic pulse source and utilizes these modulated pulses to drive oppositely phased switching transistors included in the converter. A time delay circuit initially inhibits the pulse output of the pulse-width control circuit for a short, fixed duration of time. Modulated pulses of short duration, which terminate during this time delay, permit the converter to operate with a zero percent duty cycle. This feature readily permits the starting of the converter with a short circuit across its output terminals and also protects against intermittent short circuits with no necessity to restart the converter circuit.

BRIEF DESCRIPTION OF THE DRAWINGS

An understanding of the invention may be readily attained by reference to the detailed description hereinbelow and to the drawings it describes wherein.

DETAILED DESCRIPTION

Figure 1:
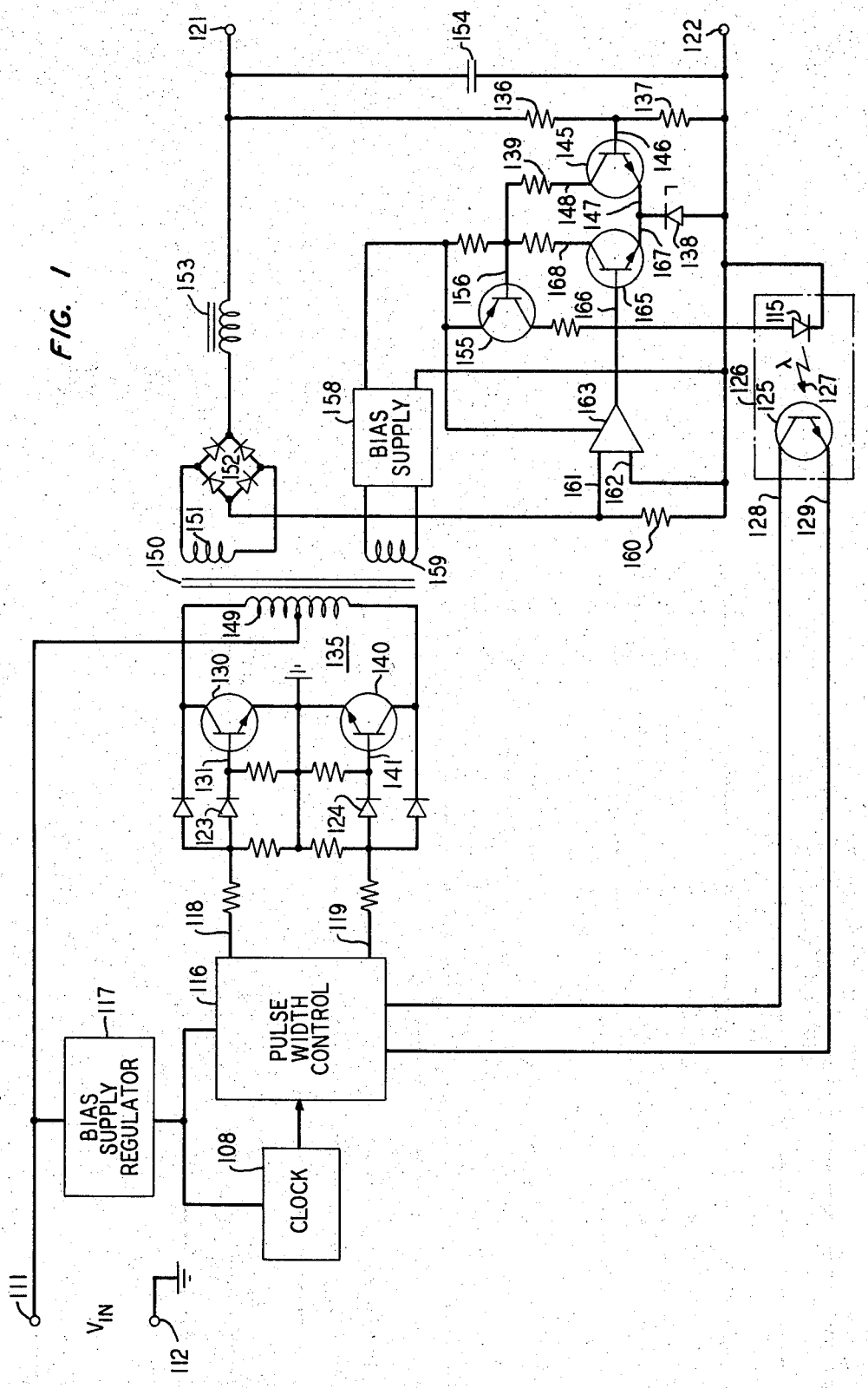
FIG. 1 is a combined block diagram and circuit schematic of a DC to DC converter designed according to the principles of the invention.

The converter circuit shown in FIG. 1 accepts a DC voltage at its input terminals 111 and 112 and supplies a regulated DC voltage at some other voltage level at its output terminals 121 and 122. The output voltage and current is controlled by a regulation circuit feedback arrangement which controls the duty cycle of the switching transistors 130 and 140 included in the inverter circuit 135. The regulation feedback circuit monitors both the output voltage and the output current and transmits control signals via a light emitting diode 115 and a phototransistor 125 to the pulse-width control circuit 116.

The input voltage is applied to the input terminals 111 and 112 by some direct current unregulated source. This source may comprise a battery or an AC powered rectifier or any other suitable DC source. This input voltage is applied to a bias supply regulator 117 which derives a regulated voltage therefrom to energize the clock source 108 and the pulse-width control 116 included in the regulation circuitry. The clock source 108 drives the pulse-width control 116 at some constant frequency. While the converter circuit will operate over a wide range of frequencies, it is desirable to select a frequency outside the audible range to eliminate audible noise.

The output of the pulse-width control 116 on leads 118 and 119 is applied, via diodes 123 and 124, to the base electrodes 131 and 141 of the switching transistors 130 and 140, respectively. The switching transistors 130 and 140 are connected in push-pull fashion in the inverter circuit 135. The two outputs on leads 118 and 119 of the pulse-width control 116 are alternately phased to drive the switching transistors 130 and 140 into alternate conducting states. The two outputs on leads 118 and 119 of the pulse-width control 116 are never simultaneously in the one state, hence the two switching transistors 130 and 140 cannot conduct simultaneously. When the output on lead 118 is in one state, the switching transistor 130 conducts. At the same time the output on lead 119 is in a zero state and the switching transistor 140 is blocking.

The alternate blocking and conducting of the two switching transistors 130 and 140 induces an alternating voltage in the primary winding 149 of the inverter transformer 150. This alternating voltage appears across the secondary winding 151 and is coupled to a full wave rectifier 152. The output of the rectifier 152 is applied to a low pass filter comprising the inductor 153 and the capacitor 154. The capacitor 154 is connected across the output terminals 121 and 122 at which the rectified output voltage appears.

The output signal appearing across the output terminals 121 and 122 is monitored by voltage and current regulation circuitry. The regulation circuitry includes a voltage divider including resistors 136 and 137 connected across the output terminals 121 and 122. A transistor 145 biased by a reference voltage breakdown diode 138 connected to its emitter 147 has its base electrode 146 connected to the voltage divider, at the junction of the resistors 136 and 137. The transistor 145 compares the proportion of the output voltage at its base electrode 146 with the constant reference voltage of the voltage breakdown diode 138. The collector 148 of transistor 145 is coupled, via resistor 139, to the base 156 of transistor 155. The collector emitter path of transistor 155 couples a bias supply 158 to the light emitting diode 115.

The bias supply 158 is connected to an auxiliary winding 159 on the inverter transformer 150. The bias supply 158 derives a bias voltage to energize the regulation circuitry from the signal across winding 159. The bias supply 158 may comprise a rectifier and voltage regulation circuit.

The voltage and current regulation circuitry operates by controlling the current flow through the light emitting diode 115. If, for example, the output voltage across terminals 121 and 122 increases in magnitude above its regulated value, the voltage signal applied to the base 146 of the transistor 145 increases. The collector-emitter current of transistor 145 increases in response thereto. This increased current drives the transistor 155 into a higher state of conduction and hence increases the current flowing through the light emitting diode 115.

The light emitting diode 115 and the phototransistor 125 may comprise a single four-terminal monolithic unit encapsulated in a dark light opaque epoxy medium 126. A clear epoxy light path 127 couples the light emitting diode 115 to the light-sensitive base of the phototransistor 125. The light emitting diode 115 projects a light signal via this light path 127 onto the photo-sensitive base of the phototransistor 125. The optical coupling between the light emitting diode 115 and the phototransistor 125 provides the desired electrical isolation between the input and output sides of the converter circuit.

The current flowing through the collector-emitter path 128–129 of the phototransistor 125 is proportional to the light output of the light emitting diode 115. Hence, as current through the light emitting diode 115 increases, the current through the collector-emitter path 128–129 of the phototransistor 125 also increases proportionately. The collector-emitter path 128–129 is interconnected with the timing control of the pulse-width control circuit 116 as described hereinbelow. The phototransistor current modifies the pulse-width of the output of the pulse-width control circuit 116. In the case where the current through the light emitting diode 115 is increasing, the timing of the pulse-width control 116 is modified to decrease the width of the output pulse. Since the pulse-width of the pulse-width control output is decreased, the duty cycle of the switching transistors 130 and 140 is decreased, which, in turn, reduces the output voltage across terminals 121 and 122 to its regulated value.

A current sensing resistor 160 is inserted between the rectifier 152 and output terminal 122 to monitor the output current of the converter circuit. A current monitoring amplifier 163 has its two input terminals 161 and 162 connected across the current sensing resistor 160 to continually monitor the output current. The output of the current monitoring amplifier 163 is applied to the base 166 of transistor 165. The emitter 167 of transistor 165 is connected to the reference voltage breakdown diode 138. The collector 168 is connected to the base 156 of the transistor 155. If the output current through the current sensing resistor 160 exceeds a certain threshold value, the output of the current monitoring amplifier is sufficient to activate conduction in the transistor 165. The signal at the collector 168 assumes control of the conductivity of transistor 155 and the voltage regulation control responsive to the conductivity of transistor 145 is superseded and the current regulation control becomes dominant. As long as the output current exceeds the threshold value, the converter operates in a current regulation mode of operation.

The current monitoring amplifier 163 is preferably a low level amplifier which can respond to very low voltages. This type of amplifier advantageously permits the use of a current sensing resistor having a very small impedance to reduce the power comsumed due to current sensing to a minimum. A low level amplifier suitable for the application described above is disclosed by R. J. Healey in the pending patent application Ser. No. 59,271, filed July 29, 1970 and assigned to the same assignee as the present application.

When the voltage output of the current monitoring amplifier 163 exceeds the threshold at which the transistor 165, as described above, begins to conduct, the current control supersedes the voltage control. In the event of a current overload at the converter output a higher current is applied to the light emitting diode 115. This higher current supplied by transistor 155 flowing through the light emitting diode 115 increases the conductance of the phototransistor 125. This increased current flowing through the collector-emitter path 128–129 modifies the timing of the pulse-width control 116. The pulse-width output of the pulse-width control 116 is reduced causing a corresponding decrease in the duty cycle of the switching transistors 130 and 140. This reduces the output current to its regulated value.

The regulation circuitry is designed so that the circuit can continuously operate with the switching transistors 130 and 140 operating at a zero percent duty cycle; that is the switching transistors 130 and 140 no longer conduct. The regulation circuitry during this period of zero percent duty cycle remains fully operative. As indicated hereinabove, the current in the light emitting diode 115 is proportional to the voltage output. When the converter is started, there is no voltage output across the terminals 121 and 122. No current flows through the light emitting diode 115 and the phototransistor 125 is in a nonconducting condition. The timing circuitry of the pulse-width control 116 is designed, as described below, to operate with the phototransistor 125 nonconducting. The pulse-width control 116 is designed to drive the switching transistors 130 and 140 at their maximum duty cycle when the phototransistor 125 is nonconducting. This permits immediate starting of the converter circuit without having to separately energize the regulation circuitry. Hence the regulation circuitry may be energized by the output voltage across the winding 159 on the inverter transformer 150.

Figure 2:
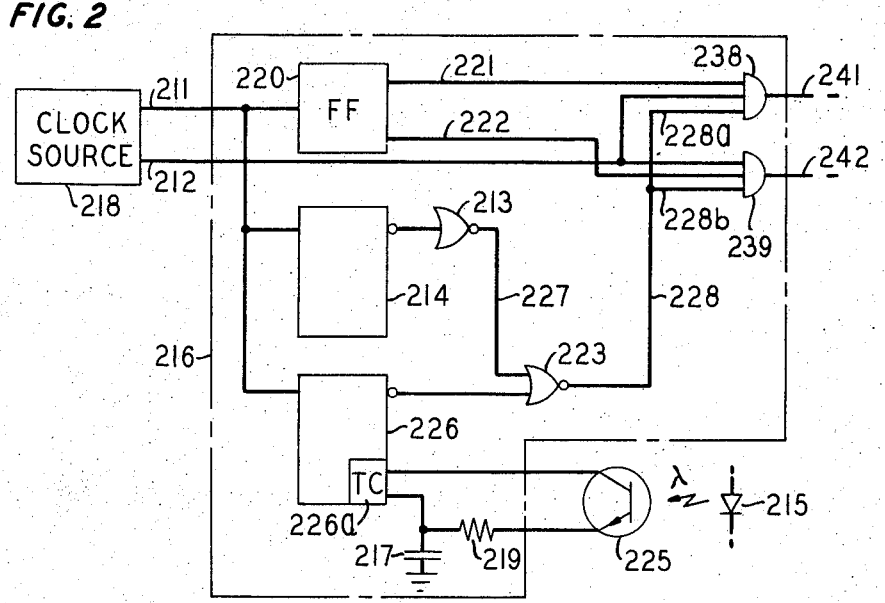
FIG. 2 is a block diagram of a pulse-width control circuit used in the converter embodiment of FIG. 1.

The pulse-width control circuit shown in FIG. 2 is designed to operate with the phototransistor 225 nonconducting during the starting of the converter and to be fully operative at a zero percent duty cycle during current overloads at the converter output.

A clock source 218 having two simultaneous complimentary outputs on the leads 211 and 212 is utilized to drive the pulse-width control 216. The complimentary outputs on leads 211 and 212 are shown by waveforms C and $\overline{C}$, respectively, in FIG. 3.

The output of the clock 218 source on lead 211 is applied to two pulse stretcher circuits 214 and 226. The pulse stretcher circuits 214 and 226 are monolithic integrated circuits which generate an output pulse whose duration is proportional to the duration of the input pulse and a time interval determined by a resistive-capacitive circuit. The timing capacitor and resistor controlling the time interval may be connected externally to the monolithic circuit. The pulse stretcher 214 generates an output pulse of fixed duration in response to the output of the clock source 218. The pulse stretcher 226 generates an output pulse of variable duration determined by the charging rate of an external timing capacitor 217. A charging resistor is included in the timing circuit 226a of pulse stretcher 226 and is connected in series with the external timing capacitor 217. The phototransistor 225 responsive to the light emitting diode 215 is connected to shunt the charging resistor in the timing circuit 226a. The phototransistor 225 is utilized to variably control the charging of the timing capacitor in proportion to the current flowing through the light emitting diode 215. The outputs of the pulse stretchers 214 and 226 are applied to the two NOR gates 213 and 223, respectively. A commercially available pulse stretcher circuit having the characteristics described above and including the NOR gates is the Motorola pulse stretcher circuit with the code designation MC675 (MHTL MC660 Series). This circuit is described in the *Microelectronics Data Book*, second edition, Supp. 1, April 1970.

Figure 3:
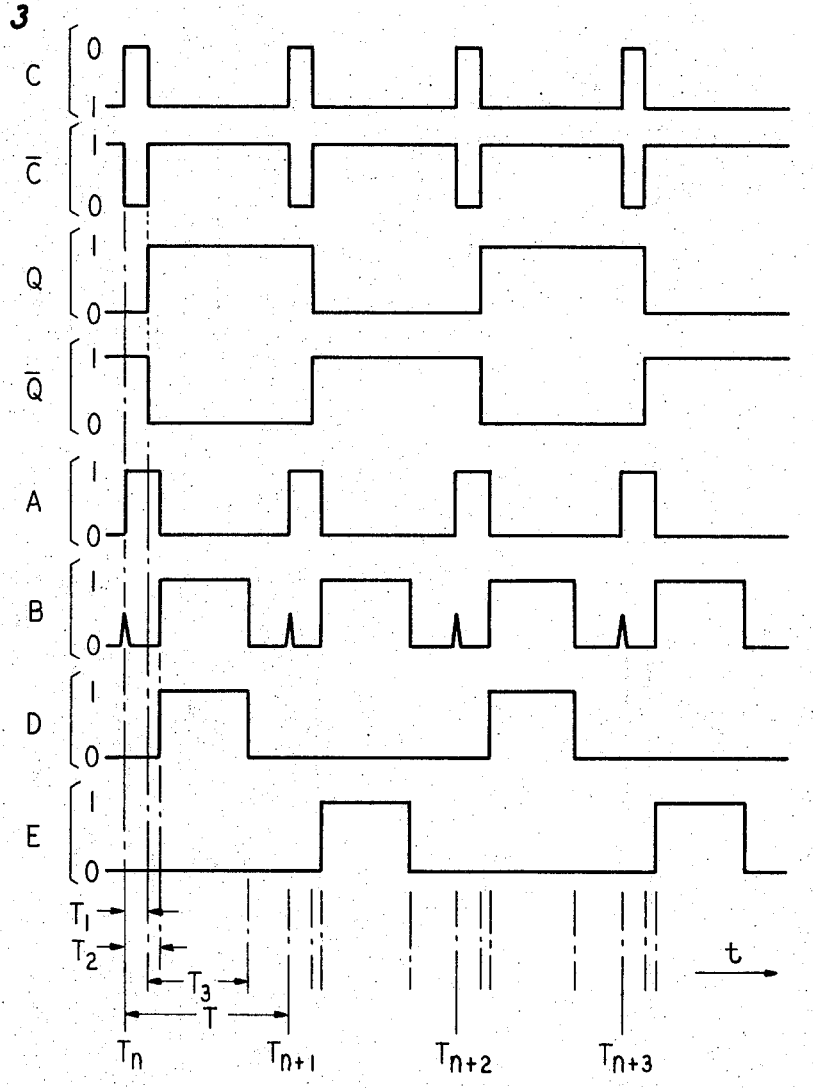
FIG. 3 shows voltage waveforms to assist in describing the operation of the pulse-width control circuit shown in FIG. 2.

The output of the NOR gate 213 shown by waveform A on FIG. 3 is applied, via lead 227, to an input of NOR gate 223. The resultant output of NOR gate 223 shown by waveform B on FIG. 3 is applied, via leads 228a and 228b to inputs of the two AND gates 238 and 239. The respective output terminals 248 and 249 of AND gates 238 and 239 are connected by resistors and diodes to the converter switching devices.

The output lead 211 of the clock 218 is connected to the toggle input of a toggle mode operated flip-flop 220. The oppositely phased outputs of flip-flop 220 on leads 221 and 222 shown by waveforms Q and $\overline{Q}$ in FIG. 3 are applied to the inputs of the AND gates 238 and 239, respectively.

The timing interval of the pulse-width control 216 begins when the output signal of the clock source 218 on lead 211 makes a one to zero transition. The clock output signal is shown as waveform C in FIG. 3 with the critical transition occurring at time $T_n + T_1$. This signal transition initiates a timing interval in both of the pulse stretchers 214 and 226. The timing interval of the pulse stretcher 214 is a fixed constant. This time interval is shown in FIG. 3 by the time period $T_2$. The timing interval for the pulse stretcher 226 is variable in proportion to the current flow in the light emitting diode 215, which, in turn, controls the conductivity of the phototransistor 225. The current in the light emitting diode 215 is in turn responsive to the voltage or current monitoring circuitry of the converter. This timing interval is shown in FIG. 3 by the timing interval designated $T_3$.

The timing interval $T_2$ is determined by a fixed timing circuit for the pulse stretcher 214. The timing interval $T_3$ is controlled by the conductivity of the phototransistor 225. If the phototransistor 225 is not conducting, the fixed charging rate of the timing circuit 226b in charging the capacitor 217 determines the maximum of the time interval $T_3$ of the pulse stretcher 226. If the phototransistor is saturated, the impedance of the resistor 219 controls the charging rate of the capacitor 217 and hence determines the minimum of the time interval $T_3$ which determines the duration of the output of AND gates 238 and 239.

Waveform A in FIG. 3 represents the signal output of the pulse stretcher 214. Waveform B in FIG. 3 represents the signal output of the pulse stretcher 226. The output signal of the pulse stretcher 214 is applied to a NOR gate 213. The output of the NOR gate 213 is in turn connected to the input of the NOR gate 223. The output of NOR gate 213 inhibits transmission through the NOR gate 223 during the time interval $T_1 + T_2$ and hence inhibits the output of the pulse stretcher 226. Thus, the signal output of the pulse stretcher 226 is inhibited at a zero state by the nonconducting state of NOR gate 223 for the duration of the successive time periods $T_1$ and $T_2$ as shown in FIG. 3. The zero output on lead 228 during these time periods is independent of the actual state of the variable timing circuit 226b of the pulse stretcher 226.

The timing interval controlled by the phototransistor 225 is represented by the time period $T_3$ shown in FIG. 3. The start of the time period $T_3$ coincides with the start of the fixed time period $T_2$. If the duration of the timing period $T_3$ is less than the duration of the timing period $T_2$, the output of the NOR gate 223, shown by waveform B in FIG. 3, remains in the zero state. Therefore, a zero percent duty cycle can be achieved in the operation of the converter circuit, without disabling the regulation control circuitry. The spike signals appearing at the times $Tn, Tn+1$ as shown in FIG. 3, waveform B, occur due to the differences in the propagation delay of the output clock pulse C shown in FIG. 3 as transmitted through the two pulse stretchers 214 and 226.

The conductivity of AND gates 238 and 239 is controlled by the complementary outputs of the flip-flop 220 on leads 221 and 222 shown by the waveforms Q and $\overline{Q}$ in FIG. 3. The complement output of the clock source 218 on lead 212 shown by waveform $\overline{C}$ in FIG. 3 is utilized to inhibit transmission through the AND gate 238 and 239 at the start of each cycle in order to block transmission of the aforementioned spike signal shown by waveform B in FIG. 3 occurring at the times $Tn$, $Tn+1$, etc. The alternating output of flip-flop 220 alternately enables the AND gates 238 and 239 into a conducting state. Hence the timed output signal of the NOR gate 223 alternately appears on leads 241 and 242 to alternately drive the switching transistors of the converter. The output signal on leads 241 and 242 is shown by waveforms D and E in FIG. 4, respectively.

Figure 4:
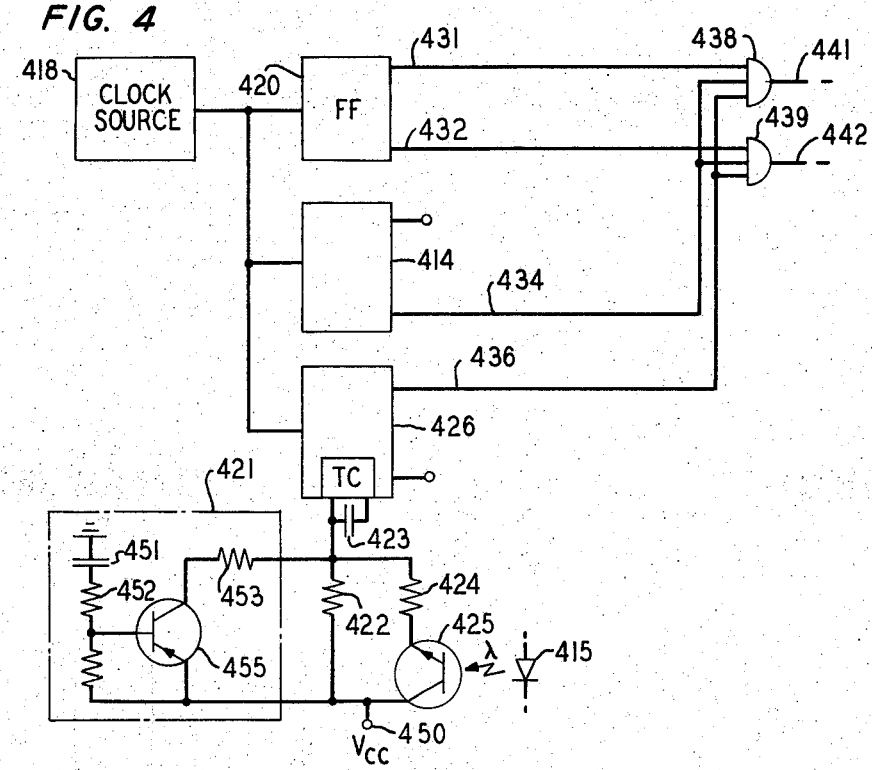
FIG. 4 is another pulse-width control circuit which may be used in the converter embodiment shown in FIG. 1.

The pulse-width control circuit shown in FIG. 4 utilizes two monostable multivibrators 414 and 426 to generate the pulse width modulated pulses to drive the converter switching devices. The multivibrators 414 and 426 are driven by the clock source 418 whose output is shown by waveform C in FIG. 5. The timing of the multivibrator 414 has a fixed timing interval and a pulse output of fixed duration. The second monostable multivibrator 426 has a variable timing interval and a pulse output of variable duration. This variable duration is responsive to the conductivity of the phototransistor 425. The timing interval of the monostable multivibrator 426 is controlled by an external timing circuit arrangement comprising the capacitor 423 connected to modify the timing circuit of the multivibrator. The capacitor is included in the cross coupling feedback path of the multivibrator. A multivibrator suitable for this application is the Motorola MC667 monolithic multivibrator (MHTL MC660 Series). This multivibrator is described in the *Microelectronics Data Book* by Motorola Semiconductor Products, Inc., second edition, Dec. 1969. This capacitor 423 is charged through a parallel charging path comprising the phototransistor 425 and resistor 424, both shunted by a resistor 422. The charging path is shunted by a soft start circuit 421 described hereinbelow which controls the rate of increase of the duty cycle of the converter when it is initially energized. The impedance of the phototransistor 425 which controls the duration of the pulse output of multivibrator 426 is controlled by a light emitting diode 415 responsive to the current and voltage monitoring portion of the converter.

The output of the clock source 418 drives a flip-flop 420 which is operating in the toggle mode. The complementary outputs of the flip-flop 420 on leads 431 and 432 are shown by waveform Q and $\overline{Q}$, respectively, in FIG. 5. The output of flip-flop 420 on leads 431 and 432 as is evident from FIG. 4, alternately enables transmission through AND gates 438 and 439. The outputs 441 and 442 of the AND gates 438 and 439, shown by waveforms D and E in FIG. 5, are connected to drive the switching devices of the converter.

Figure 5:
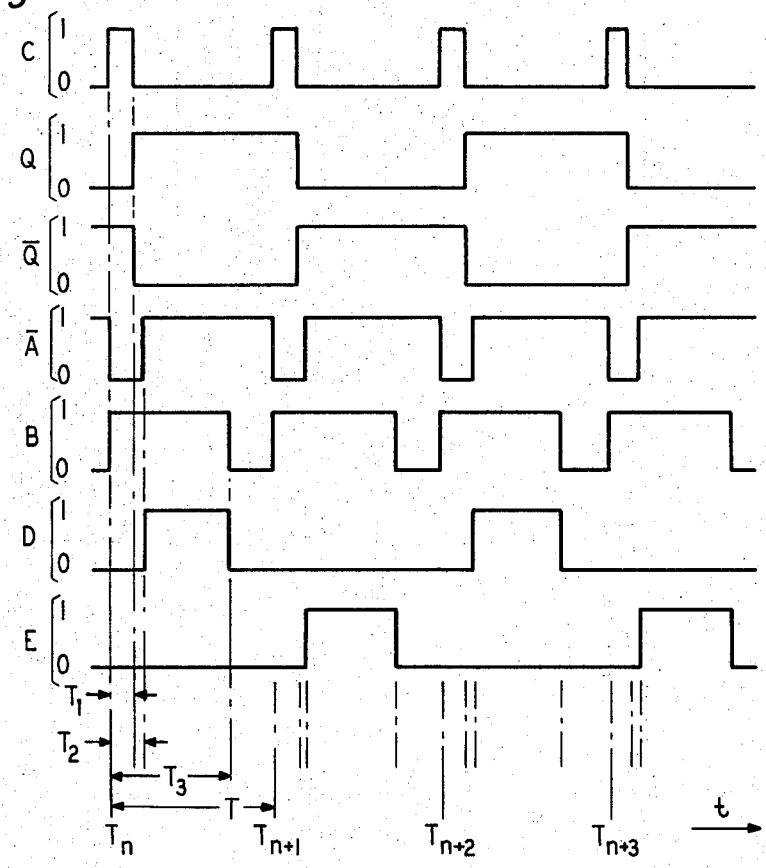
FIG. 5 shows voltage waveforms to assist in describing the operation of the pulse-width control circuit shown in FIG. 4.

The complement output of the monostable multivibrator 414 shown by waveform $\overline{A}$ in FIG. 5 is applied via lead 434 to each of the AND gates 438 and 439. This output, during the time interval $T_2$, inhibits transmission through the AND gates 438 and 439. The output of multivibrator 426, shown by waveform B in FIG. 5, is applied, via lead 436, to each of the AND gates 438 and 439. It is readily apparent that the duration of the output of multivibrator 426 shown by time interval $T_3$ in FIG. 5 controls the AND gate output signal. It is also apparent that if the signal duration of waveform B is less than the time interval $T_2$, the converter switching devices operate at a zero percent duty cycle.

The soft starting circuit 421 is added to the timing circuit to constrain the output of the converter to gradually increase in magnitude after the application of input power to the converter. Upon the initial application of power to the converter circuit, the capacitor 451 draws a current from the bias voltage supply Vcc at terminal 450 through the base emitter path of transistor 455 and resistor 452. The initial current drawn by capacitor 451 saturates the transistor 455. Since at starting the phototransistor 425 is not conducting, the pulse duration of the pulse-width control is determined by the parallel impedance of resistors 422 and 453 and the capacitance of capacitor 423. The impedance is selected so that the pulse-width at starting is very short in duration. As the capacitor 451 is charged up, the current flowing through the base emitter of transistor 455 decreases and transistor 455 comes out of saturation. The impedance of the transistor 455 increases and the pulse-width as controlled by the soft start circuit increases in duration exponentially. Eventually the transistor 455 ceases to conduct when capacitor 451 is fully charged and the pulse-width control operates to control the output signal of the converter at the regulated value. The soft start circuit described herein may also be connected to the timing circuit of the pulse width control described with respect to FIG. 2.

What is claimed is:

1. A DC to DC converter comprising a pair of switching devices, means to compare the output signal of said converter with a reference signal, pulse signal means to control said switching devices including means to modulate said pulse signals comprising a periodic pulse source, a first means to generate a fixed duration pulse triggered by said periodic pulse source, a second means triggered by said periodic pulse source to generate a pulse whose duration is variable in response to said means to compare, means to couple the output of said second means to generate to said switching devices and means to inhibit the output of said second means to generate during the interval and responsive to the pulse output of said first means to generate.

2. A DC to DC converter as defined in claim 1 wherein the outputs of said first and second means to generate are applied to a NOR gate, the output of said NOR gate being coupled in parallel to two AND gates and said AND gates alternately enabled in response to the complementary outputs of a flip-flop responsive to said periodic pulse source.

3. A DC to DC converter as defined in claim 2 wherein said second means to generate includes a variable timing circuit with a controlled impedance charging path, a soft start connected across said controlled impedance charging path to limit the converter output upon initial energization, said soft start circuit comprising a transistor and a charging resistor connected in series and shunting said controlled impedance, a charging capacitor connected to the base of said transistor whereby the charge current drawn by said capacitor upon initial energization of said converter saturates said transistor and limits the pulse duration of the output of said second means to generate to limit the output signal of said converter.

4. A DC to DC converter as defined in claim 1 wherein said first means to generate comprises a first monostable multivibrator with a first and second complementary output and said second means to generate comprises a second monostable multivibrator with a variable timing circuit and having first and second complementary outputs phase related to the complementary output of said first monostable multivibrator, first and second AND gates, flip-flop means responsive to said periodic pulse source to alternately enable said first and second AND gates, and the first complementary output of said first multivibrator and the second complementary output of said second multivibrator, each being connected in parallel to said first and second AND gates.

5. A DC to DC converter as defined in claim 4 wherein said variable timing circuit includes a controlled impedance charging path, a soft start circuit connected across said controlled impedances of said variable timing circuit to limit the converter output upon initial energization, said soft start circuit comprising a transistor and a charging resistor connected in series and shunting said controlled impedance, a charging capacitor connected to the base of said transistor whereby the charge current drawn by said capacitor upon initial energization of said converter saturates said transistor and limits the pulse duration of the output of said second monostable multivibrator to limit the output signal of said converter.

6. A DC to DC converter comprising, an inverter circuit including two oppositely phased switching devices, output means coupled to said inverter circuit, means to monitor the signal output of said output means including means to generate an error signal should the signal magnitude depart from some designated value, switching control means coupled to drive said switching devices and responsive to said error signal, said switching control means including a repetitive pulse source, means to modulate the pulse width output of said pulse source in response to said error signal and means to inhibit for a fixed time period at the start of each cycle the transmission of an initial portion of said modulated pulse output and means to alternately steer said modulated pulses to said oppositely phased switching devices, wherein said switching devices operate at a zero percent duty cycle if said modulated pulse terminates within the duration of said fixed time period.

7. A DC to DC converter as defined in claim 6 wherein said means to modulate comprises a pulse circuit with a variable timing arrangement responsive to said error signal and said means to inhibit comprises a second pulse circuit with a fixed timing arrangement, means to utilize the signal output of said second pulse circuit to block transmission of the output of said first pulse circuit.

8. A DC to DC converter as defined in claim 7 further including means to limit modulation of the pulse output of said pulse source at the initial energization of said converter including a current path comprising a transistor, means to bias said transistor into saturation, an energy storage device coupled to said transistor and means to store energy in said storage device and turn said transistor off upon the attainment of a certain energy level.

* * * * *